Oct. 26, 1965  J. BLASS ETAL  3,214,755
THREE-DIMENSIONAL RADAR SYSTEM
Filed Feb. 24, 1964  15 Sheets-Sheet 1

INVENTORS
JUDD BLASS
EDWARD M. BUYER
EDWARD J. SHUBEL
MURRAY SIMPSON
BY
Moses, Nolte & Nolte
ATTORNEYS

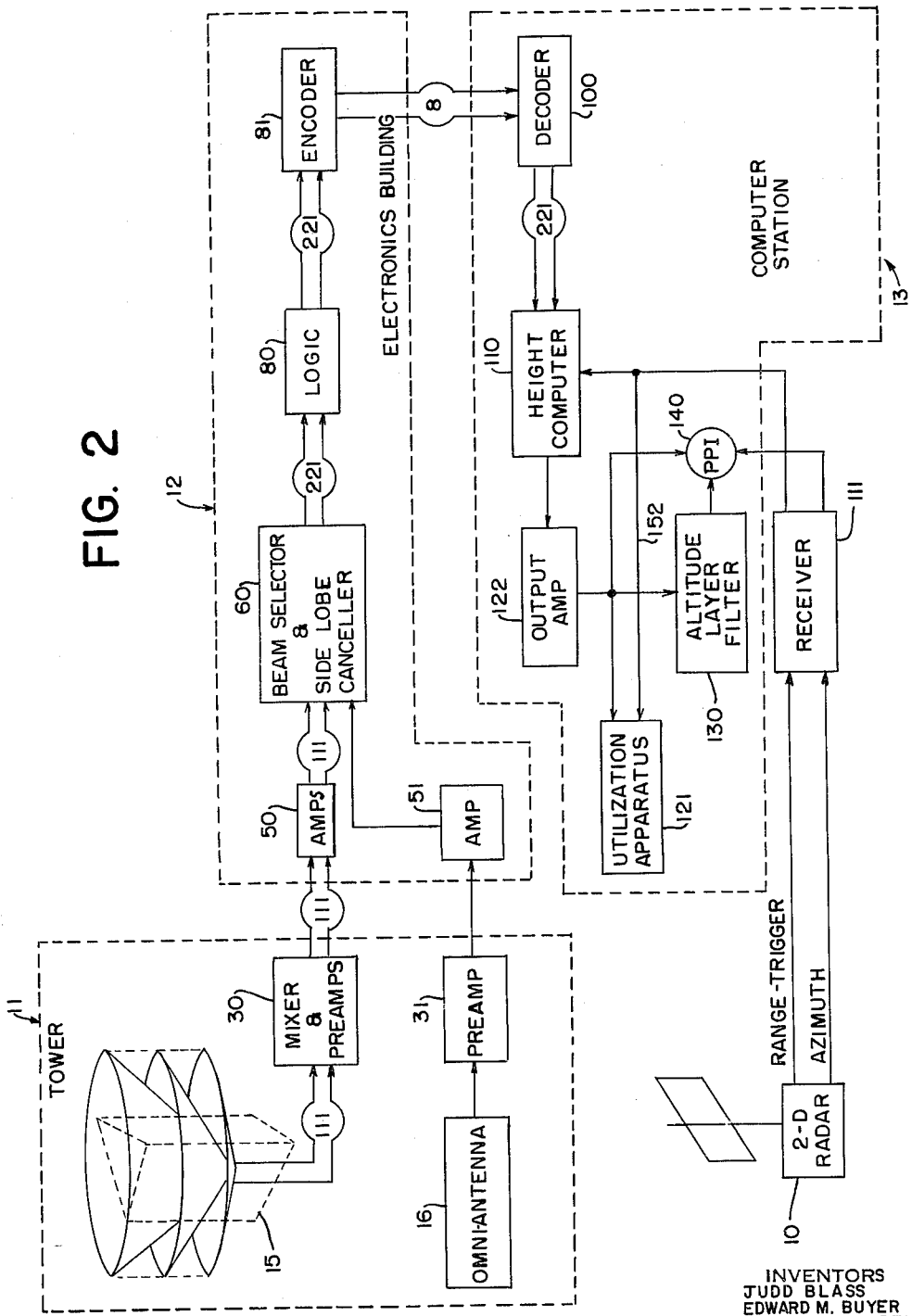

Oct. 26, 1965 J. BLASS ETAL 3,214,755
THREE-DIMENSIONAL RADAR SYSTEM
Filed Feb. 24, 1964 15 Sheets-Sheet 3

INVENTORS
JUDD BLASS
EDWARD M. BUYER
EDWARD J. SHUBEL
MURRAY SIMPSON
BY
Moses, Nolte & Nolte
ATTORNEYS Oct. 26, 1965    J. BLASS ET AL    3,214,755
THREE-DIMENSIONAL RADAR SYSTEM
Filed Feb. 24, 1964    15 Sheets-Sheet 4
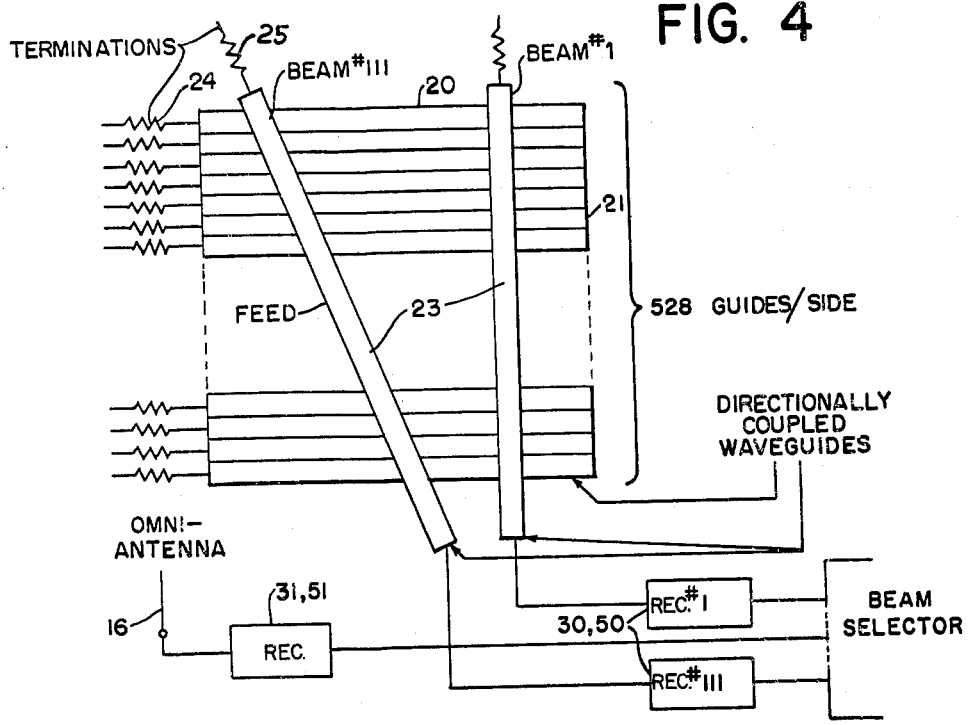
FIG. 4
FIG. 4A
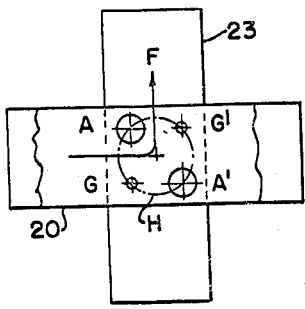
FIG. 4B
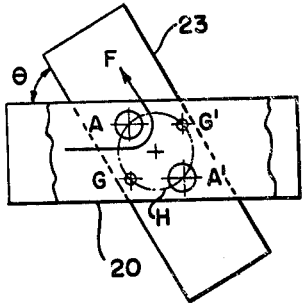
FIG. 4C
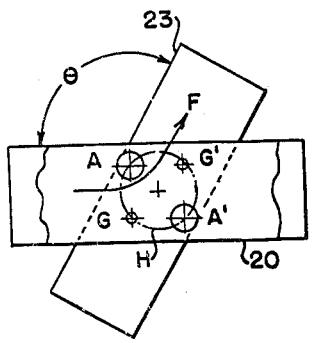
INVENTORS
JUDD BLASS
EDWARD M. BUYER
EDWARD J. SHUBEL
MURRAY SIMPSON
BY
Nolte & Nolte
ATTORNEYS

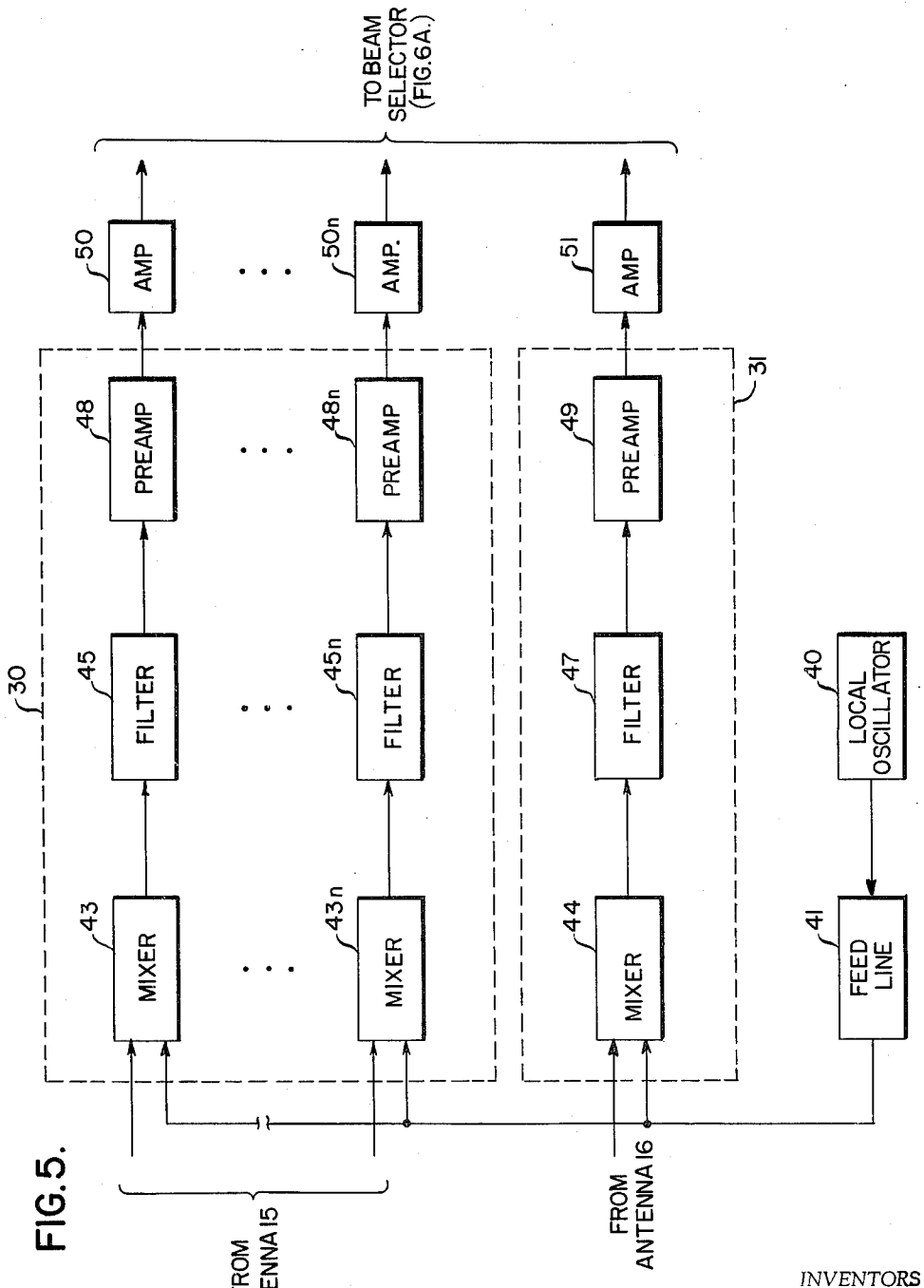

INVENTORS
JUDD BLASS
EDWARD M. BUYER
EDWARD J. SHUBEL
MURRAY SIMPSON
BY
Nolte & Nolte
ATTORNEYS

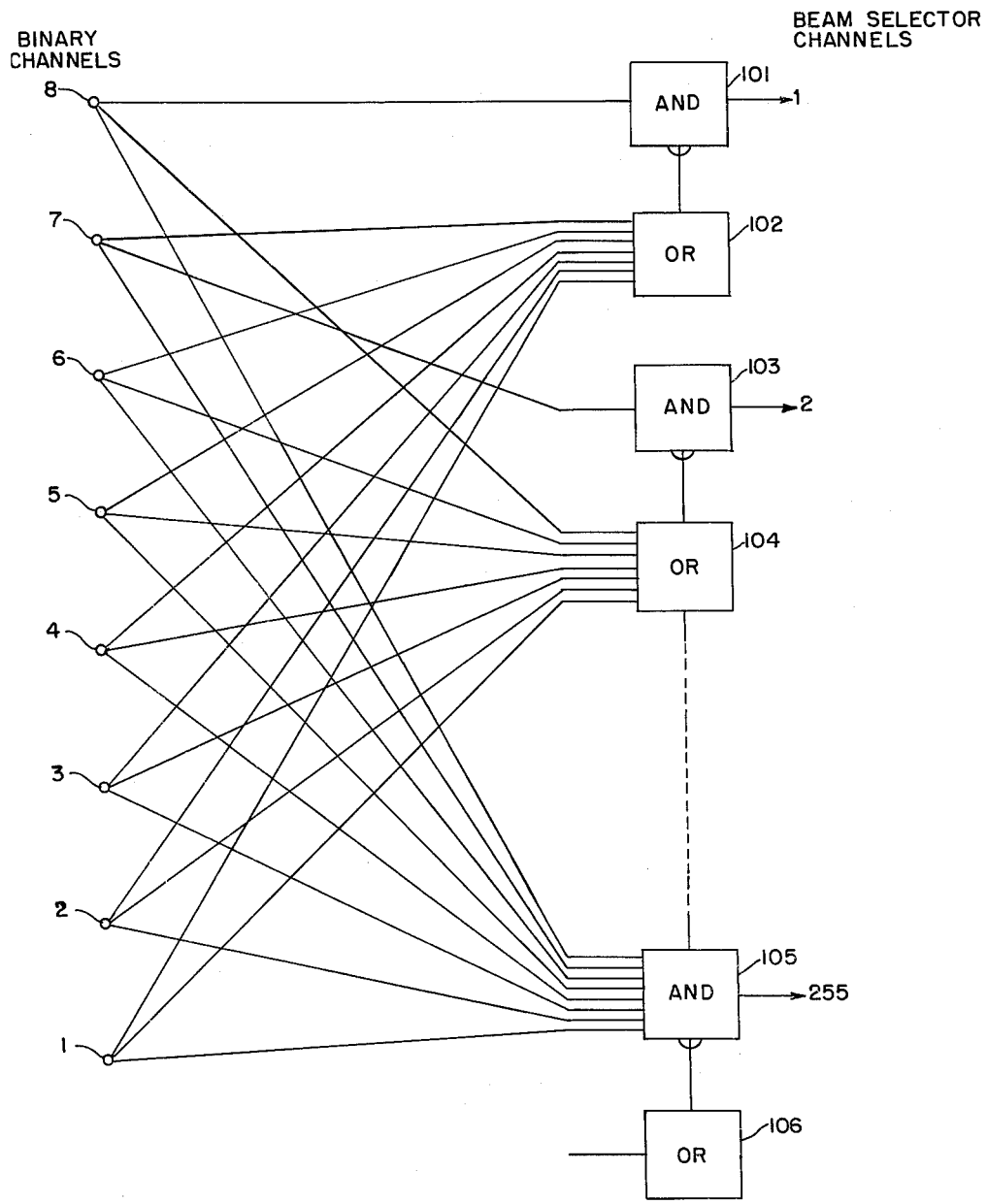

$[h = p \sin \theta]$

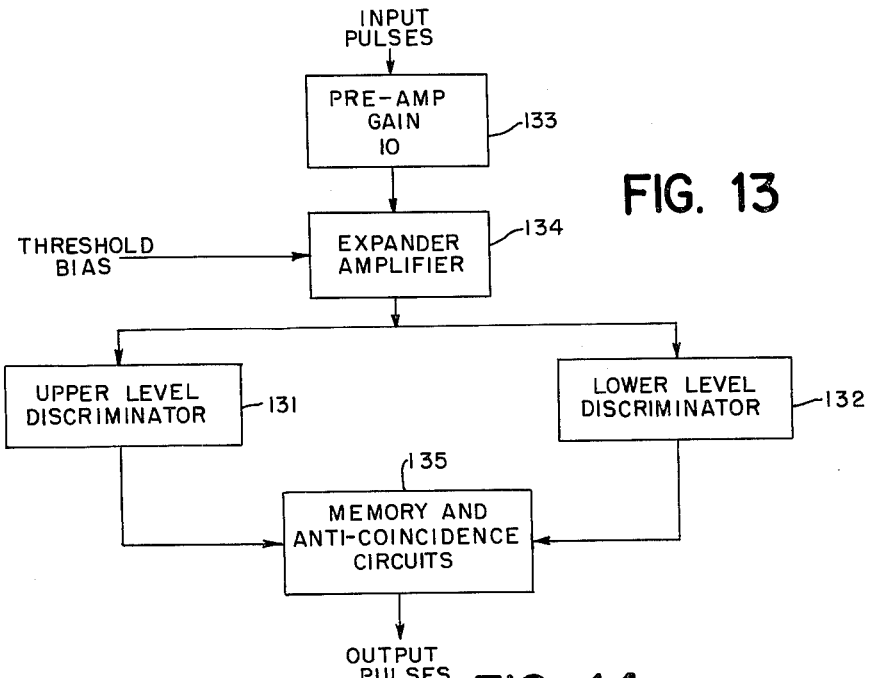
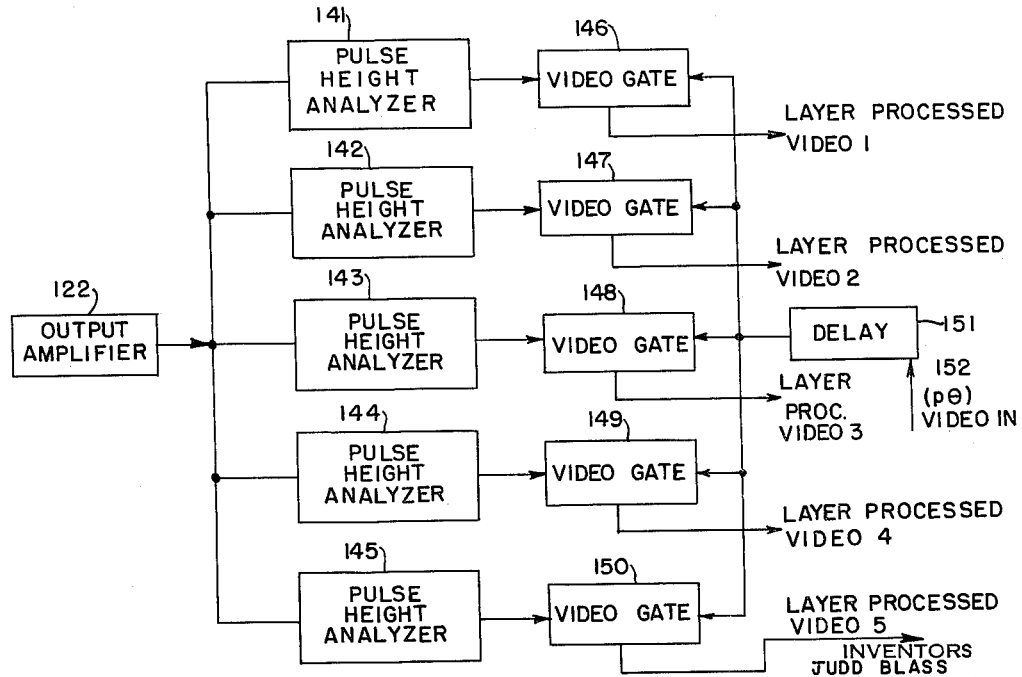

United States Patent Office 3,214,755
Patented Oct. 26, 1965

3,214,755
THREE-DIMENSIONAL RADAR SYSTEM
Judd Blass, Bayside, Edward M. Buyer, Bayport, Edward J. Shubel, Plainview, and Murray Simpson, Garden City, N.Y., assignors to Maxson Electronics Corporation, Great River, N.Y., a corporation of New York
Filed Feb. 24, 1964, Ser. No. 373,117
27 Claims. (Cl. 343—11)

This invention relates to a three dimensional radar system and is a continuation-in-part of application Serial No. 25,151, filed April 27, 1960, now abandoned.

An object of this invention is to provide a radar system capable of producing information relative to the height of one or more aircraft under surveillance, simultaneously with the generation of information relative to the range and azimuth of the aircraft.

Another object of the invention is to provide an omnidirectional height finding antenna system having great resolution with respect to height.

Still another object of the invention is to provide a stationary antenna capable of producing height information of a target regardless of its azimuth.

It is also an object of the invention to provide a stationary antenna capable of distinguishing between signals arriving at different angles of elevation.

Yet another object is to provide a system for simultaneously indicating the range, height and azimuth of one or more targets.

Another object of the invention is to provide a three dimensional radar system including means for inhibiting the display of aircraft outside of a preselected height range.

Many other objects and advantages of the invention will become apparent and the invention itself will be fully understood from the following description and the drawings, wherein:

FIG. 2 is a block diagram of the radar system;

FIG. 4 is a schematic diagram of the circuitry of the antenna;

FIGS. 4A, 4B and 4C are schematic views of the directional couplers;

FIG. 5 is a block diagram of the circuits located at the antenna tower;

FIGS. 8A and 8B illustrate a block diagram of the binary decoder;

FIG. 13 is a block diagram of the single channel analyzer;

FIG. 14 is a block diagram of the altitude layer processing circuit;

Figure 1:
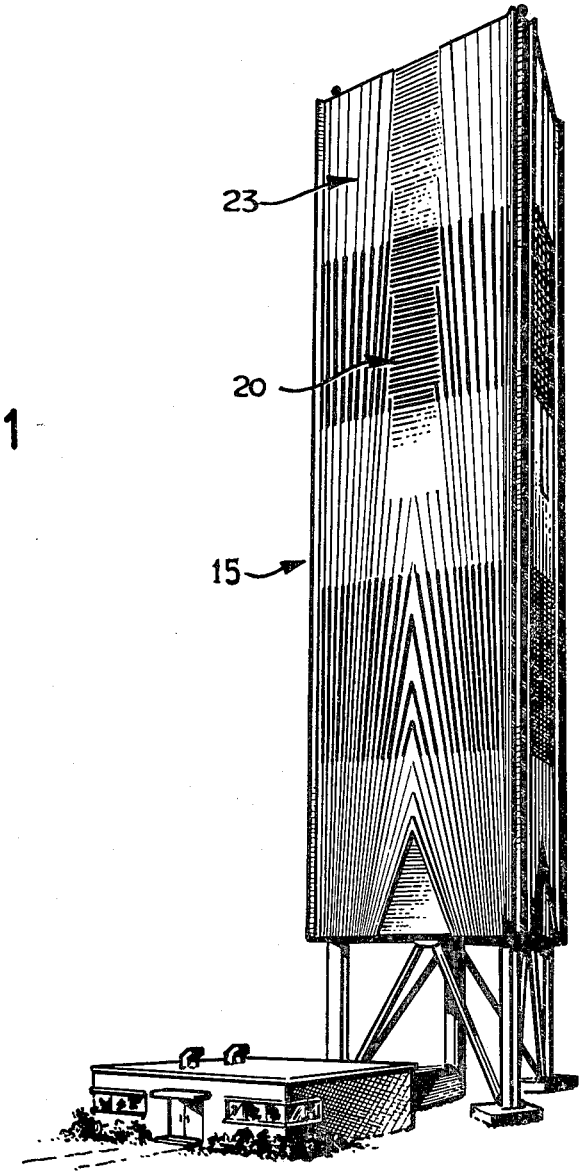
FIG. 1 is a persepctive view of the height finding antenna.

A block diagram of the entire system is shown in FIG. 2. The manner in which the various components of FIG. 2 operate will be described in greater detail below. However, a broad description of the manner in which the various circuits function will facilitate an understanding of the invention.

The target is illuminated by a two dimensinal radar unit 10 which supplies an RF illumination pulse, a trigger to serve as zero range reference, and an azimuth signal to show target bearing. A three demensional antenna 15 receives the signals reflected from the target. Antenna 15 is located at the tower station 11 and produces a radiation pattern appearing to have 111 conically shaped lobes, three of the cones being illustrated. Each of the lobes has a separate channel responsive to the signals received thereby, and since each cone has a different angle of elevation, depending upon the angle of elevation and the range of a target (or targets), signals of varying strength will appear in certain ones of these channels. These signals are fed through mixers and pre-amplifiers 30 to the electronics building 12 which may be located close to tower 11. At this station, the channels are all amplified in amplifiers 50 and fed to a beam selector and side lobe canceller 60, the purpose of which is to produce an analog signal on one of a plurality of output leads depending upon the angle of elevation of the target. Simultaneously, a side lobe cancellation signal from the omnidirectional antenna 16 is fed by a pre-amplifier 31 and amplifier 51 to the beam selecting circuits 60. The signal from antenna 16 inhibits the side lobe cancellation gates when it is above a predetermined level with respect to the levels from amplifiers 50. In this manner since the signals from the omnidirectional antenna 16 are at a level intermediate the high level main beam signals and the low level side lobe signals, only the main beam signals are passed.

When a target is present, signals will be picked up by more than one of the conical radiation patterns, and, under certain circumstances, it is possible that two of the radiation patterns will receive equally strong signals from a single target. Thus, it is the function of the beam selector to produce a signal on one of 221 output channels indicating the angle of elevation of the target. The manner in which this is accomplished will be described in more detail below. At this point, it is only necessary to recognize that each of the 221 output channels from beam selector 60 indicates a different angle of elevation for a given target, and that the amplitude of the signal is indicative of the distance or range of the target.

The signals are fed to a logic circuit 80 and then to an encoder 81 wherein the 221 separate channels are converted by conventional digital techniques into an eight channel transmission system. This is not a necessary feature but is highly desirable if the information is to be transmitted for a considerable distance to a computer station 13.

At the computer station, a decoder 100 reconverts the eight transmission channels into the original 221 channels. The signals on these 221 channels, which are indicative of the angle of elevation and range of a target, are then fed to the height computer 110.

The two-dimensional radar 10 also receives the reflected signal from the target and transmits range-trigger and azimuth information to a receiver 111 in a conventional manner. Receiver 111 is not necessary and the two signals from radar unit 10 may be coupled directly to height computer 10 and PPI display 140, respectively. Thus, since the angle of elevation of a target is indicated by the signals from the decoder 100 and range information is inherent in the time of occurrence of the decoder signal, it is then possible for computer 110 to trigonometrically determine the relative height of the target or targets involved. Computer 110 includes in each channel a separate computer adapted to produce a pulse whose amplitude is the analog of the target height, if a signal is present in its channel.

The range and height information is fed from the computer through an output amplifier 122 to utilization apparatus 121 and PPI display 140. The PPI display may be arranged so that the outer portion of the scope indicates the relative height of the target. Thus, a first spot on the scope would indicate in a conventional manner the range and azimuth of the desired target. However, there would also be provided at the same time a second spot toward the outer circumference of the scope whose radial distance from a given circle on the scope would indicate the relative height of the target. In this manner, if two targets appear to have the identical range and azimuth, the operator at a single glance could determine by their relative heights whether or not there was actually any danger of collision. This type of display is more fully described in application No. 150,287, filed November 6, 1961, and entitled "Three Dimensional Display."

As a refinement over the basic concept, an altitude layer filter 130 may be provided to eliminate all signals falling out of a certain height range. In other words, if it was desired to only look at targets between 10,000 and 20,000 feet, the altitude layer filter 130 could be properly set so that targets outside of this range would produce no indication upon the scope.

Figure 3A:
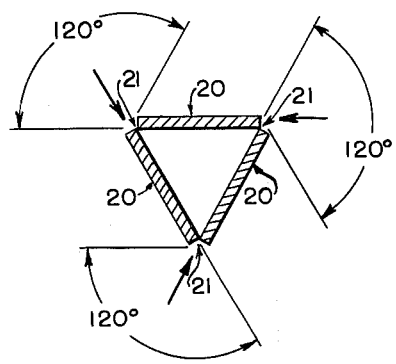
FIGS. 3A and 3B are diagrams showing the radiation characteristics of the antenna of FIG. 1.
Figure 3B:
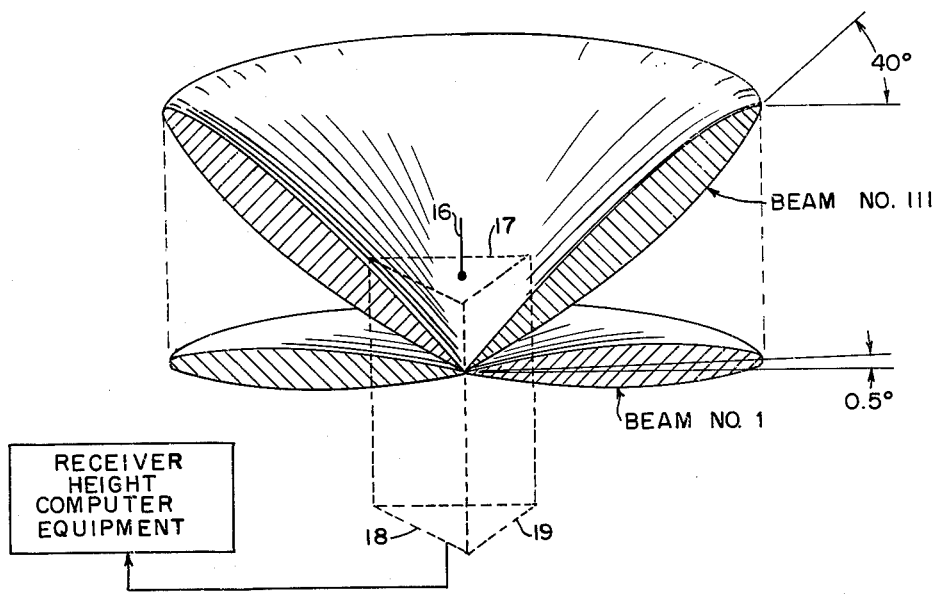

For purposes of description, one actual embodiment of the height finding antenna will be described. The antenna 15 consists of a 160 foot high structure having three antennas arranged in the form of an equilateral triangle as shown in FIGS. 1 and 3B. On each of the three sides 17, 18 and 19 of the antenna there is an array or vertical stack of open ended horizontal wave guides 20 which receive energy from the directions indicated by the arrows in FIG. 3A. Each array has a coverage of about 120° azimuth and the arrays are connected to provide 360° coverage in the azimuth plane. FIG. 3B illustrates the radiation pattern emanating from the antenna when it is considered as a point source. It should be understood that the radiation pattern illustrated in FIG. 3B is only intended to indicate the directivity of the pattern and not the relative strength in a given direction. In an actual embodiment of the invention, the antenna array developed 111 separate beams, the lowest one having an axis .5° above the horizontal and the highest one having an axis 40° above the horizontal. The width of the lowermost beam was approximately .2° and the width of the uppermost beam approximately 1°. As shown in FIG. 3B in a sectional view, each of the beams has a generally conical shape, and although only two are indicated, the antenna actually produces an array of 111 beams, each one extending at a slightly different angle of elevation.

It should also be understood that these separate beams are not generated by individual wave guides but, rather, are a combination of the patterns of each of the individual wave guides. As far as the targets are concerned, at a distance from the antenna the patterns of FIG. 3B are quite close to what is actually seen. It should also be realized that it is not necessary to always use all 111 beams and, if desired, it is possible to suppress one or more beams. The antenna consists entirely of a wave guide and supporting construction, there being no electronic components within the actual antenna system itself. An omni-directional antenna 16 is placed on top of the antenna structure and it is used for side lobe cancellation, as will be described later.

The arrangement of the wave guides on one of the three sides of the antenna is schematically indicated in FIGS. 1 and 4. In a particular actual embodiment of the invention, there were on each side 528 horizontal wave guides 20, and 111 feed guides 23 extending in a generally vertical direction. As is evident from the wave guide 23 from beam 111 in FIG. 4 and from FIG. 1, a number of feed guides 23 extend at different angles to the vertical for the purpose of providing different amounts of delay between the connections of the feed guides 23 to adjacent horizontal guides 20. All of the wave guides and feed lines are terminated in their characteristic impedances by terminations 24 and 25, respectively, to prevent reflection. The right hand end of each wave guide 20 in FIG. 4 has a slot or opening for receiving the radiation. The antenna separates signals arriving from different directions due to the phase distribution across its aperture formed by the slots 21.

To illustrate the operation of the antenna, consider the array as a transmitter. The array of radiating elements is energized by a series of feed lines which couples each of them through a directional coupler at the junction or cross over of each vertical feed with all the horizontal wave guides to which it is connected. The horizontal and vertical wave guides for this purpose may have a common wall or contiguous walls provided with a number of openings arranged to give directional coupling. If only a single narrow elevation beam were required, only a single feed line would be needed. In this case, the energy from the feed line, say for beam 1 in FIG. 4, would be coupled to the radiating elements or slots 21. Assuming a perfect directional coupler, the power directed toward the resistive termination 24 would be zero. If a second feed line (say, for beam 111 in FIG. 4) is located between the resistive termination 24 and the first feed line and is connected to the horizontal wave guides to collimate a second wave, power from the first feed line would not be radiated in the direction of the wave from the second feed line. In essence then, the radiation pattern of the first feed, that is beam 1 in the example, is not affected by the presence of the second. A small fraction of the energy which is coupled to an antenna element or horizontal wave guide by the second feed is extracted by the common coupling element of the first feed, however, the phase distribution of the energy emitted by the second feed will not be collimated by the first feed line, since the beam pointing directions of two lines are different. Due to the presence of the directional coupling, whatever energy is coupled into the first feed line from the second is directed toward the resistive termination of the first feed line. Thus the mutual coupling between the first and the second lines results in destructive interference. The greater the separation between beam directions, the greater will be the destructive interference. The theory of operation of this type of antenna has been described in greater detail in the application of Judd Blass, Serial No. 798,078, filed March 9, 1959. From the above description of the operation of the antenna it will be understood that it functions similarly as a receiver.

For forming the 111 elevation beams of different angles, feed wave guides 23 extend upwardly along the tower to different heights and are inclined at different angles to the vertical. Due to the varying slope of feed lines 23, different feed lines are connected to successive horizontal wave guides with different amounts of phase shift, or delay, the delay, of course, being greater for feed lines having greater deviation from the vertical. The general arrangement of the vertical feed lines is best illustrated in FIG. 1.

The directional coupling between feed lines 23 and the horizontal wave guides may consist of two diagonally placed large openings A and A' in the common wall between a feed line and each horizontal wave guide to which it is coupled, as indicated in FIGS. 4A, 4B and 4C, and two diagonally opposite smaller holes G and G'. The diameter of the larger holes may be about 1.59 times greater than the diameter of the smaller holes and the centers of the four holes may lie on a circle H. Differing amounts of coupling between the feed lines 23 and the horizontal wave guides 20 are obtained simply by using feed holes A and A' of different diameters. The direction of feed is indicated by the arrow F. The larger holes A and A' control the direction and amount of coupling while the smaller holes are for the purpose of neutralizing coupling in the undesired direction. The directional couplers per se are described in application Ser. No. 25,123 of Shubel, filed on the same date as this application, entitled "Cross Guide Directional Coupler," and now abandoned.

The output of each feed line 23 and the omnidirectional antenna 16 is processed by a separate receiving chain comprising mixers and preamplifiers 30 and 31 as indicated in FIG. 2, and shown in greater detail in FIG. 5. The received signal in each channel is mixed with the output of a common local oscillator 40. The local oscillator excitation is distributed through a feed line 41 to mixers 43 to $43n$ and 44, connected to antennas 15 and 16. In FIG. 5 two of the 111 channels from elevation antenna 15 are shown. The mixers are followed by filters 45 to $45n$ and 47 which select the IF components and separate out the D.C. components. The outputs of the mixers are amplified in low noise preamplifiers 48 to $48n$ and 49 and transmitted by coaxial cable to the units in the electronics building 12. In the electronics building, post amplification takes place in logarithmic amplifiers 50 to $50n$ and 51.

Figure 6B:
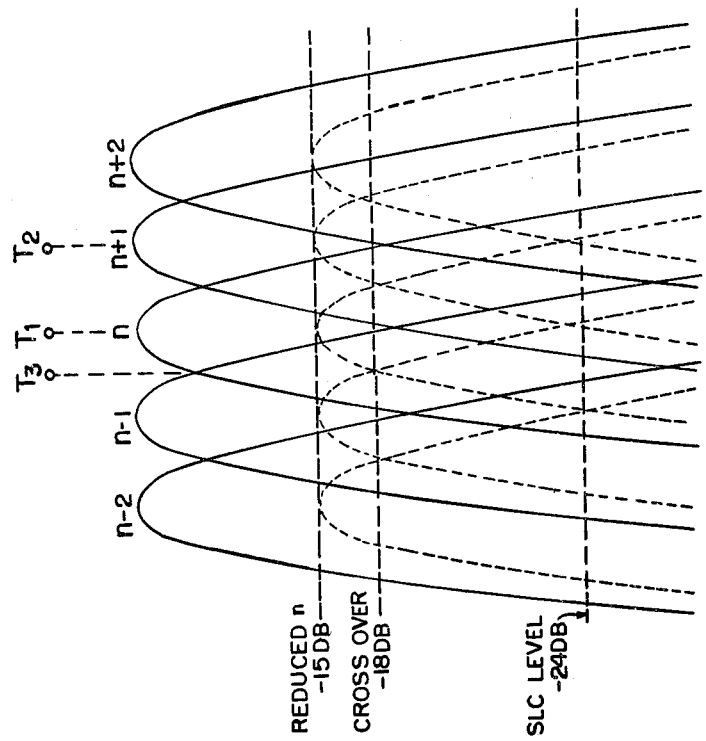
FIGS. 6A and 6B are diagrams of the side lobe translation circuits and their operation.
Figure 6A:
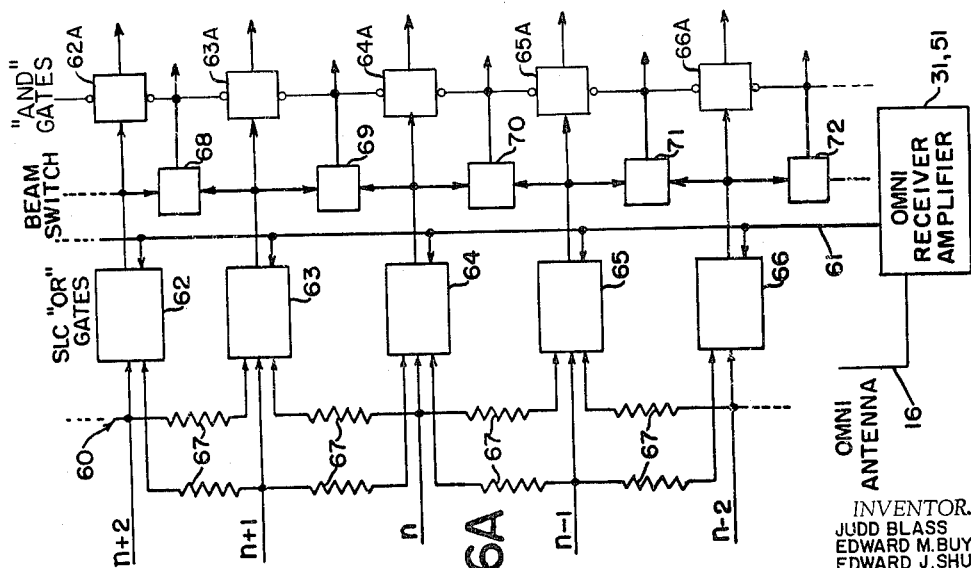

The characteristics of multidirectional antenna 15 are such that the reflections from isolated targets or from too closely spaced targets may be received in the main lobes of two, three, or four beams simultaneously. The beam selector 60 connected to amplifiers 50 to $50n$ and 51 determines the actual target elevations by comparing the outputs of amplifiers 50 and 51 and supplying triggers corresponding to the most probable locations of the targets. Referring to FIG. 6A, there are shown five adjacent beams formed by the antenna 15, labeled $n$, $n+1$, $n+2$, $n-1$, and $n-2$. These adjacent beams are illustrated in FIG. 6B by the solid line curves. These curves may be considered as representative of the amplitude of the beams plotted against the elevation angle as an abscissa. Within each beam there is shown a dash line beam having an amplitude of 15 db less than the solid line beam. In FIG. 6A each channel is marked by the number of the beam $n$, $n+1$, $n+2$, $n-1$, and $n-2$ and feeds a side lobe cancellation (SLC) "OR" gate 62–66. Gates 62–66 have been designated as "OR" gates because they are all operative and thus, although in a sense these gates are actually analog devices, a conventional diode "OR" gate will produce the desired result. The omnidirectional antenna 16 is connected through the amplifiers 31, 51 and the line 61 to the "OR" gates 62–66. Each input channel, $n$, $n+1$, $n+2$, $n-1$, and $n-2$ is connected to adjacent channels through attenuating resistors 67.

In order to explain the operation of the side lobe cancellation and the beam selection functions of the circuit of FIG. 6A, three different reception conditions will be considered. First consider the case where a target $T_1$ is received at the maximum amplitude point of beam $n$. Under this condition, there will be signals received in beams $n$, $n+1$, $n-1$, $n+2$ and $n-2$. All five signals will appear in the output of the receivers and are fed to their respective "OR" gates 62–66. The contribution of the receiver outputs of beams corresponding to $n+1$ and $n-1$ are compared with the signal from beam $n$ which is attenuated a factor of 15 db by resistors 67. If the amplitude of this attenuated signal is greater than the signal contributed by the beam $n+1$ and $n-1$, the $n+1$ and $n-1$ "OR" gates 63, 65 are inhibited and there is no output appearing in these circuits. The signals contributed by beams $n+2$ and $n-2$ are compared to the output of the omnidirectional system which, being greater in intensity, will inhibit the "OR" gates 62–66 associated with beams $n+2$ and $n-2$. As a result there will be only an output from the "OR" gate which is associated with beam $n$.

In the second case an additional target T2 is being received at the maximum amplitude point of beam $n+1$ and is lower in signal level than T1 by approximately 10 db. If the 15 db attenuation of signal $n$ were not provided, the signal contributed by the target T1 would be greater in amplitude than that received from target T2 and consequently would inhibit the "OR" gate 65 of beam $n+1$, which would result in a complete loss of the target T2. From this discussion it can be seen that a target whose amplitude is 15 db or more below the signal received from a target in an adjacent beam will be inhibited in the associated "OR" gate.

Consider the case where a target T3 (FIG. 6A) is located midway between beams $n$ and $n-1$ so that there are equal signal contributions from both beams. The outputs from beams $n-2$, $n+1$ and $n+2$ are below the side lobe cancellation level and therefore can be disregarded. The equal signal levels from beams $n-1$ and $n$ results in equal outputs from the respective "OR" gates 64, 65 and unless these outputs are further processed the results will be two height outputs for the one single target and neither will be correct. This ambiguous case is resolved by comparing the two outputs in the comparison circuit 70 of circuits 68–72. Where there are equal contributions from adjacent beams, the beam selection circuitry will produce an output from comparison circuit 70 and activates an additional channel whose analog elevation output corresponds to a target midway between beams $n$ and $n-1$. At the same time, of course, the output of the comparison circuit may be used in a conventional manner to inhibit the signals from the two SLC "OR" gates. For example, each "OR" gate 62, 63, etc. may be coupled to an AND gate 62A, 63A, etc., respectively. The latter gates include two inhibiting inputs connected to adjacent comparison circuits 68, 69, etc., whereby the presence of a signal on a comparison circuit will prevent translation of the outputs from the adjacent comparison circuits. Although the cross-over height computers provide the capability of measuring elevation on a single target to within +250 feet, this must not be construed as implying that the system is capable of resolving these two targets in the same range—azimuth capsule. Targets T1 and T3 would not be separated as independent targets and would print out in the height computer as a single target as seen either at $n$ or the crossover point of $n$ and $n-1$ depending upon the relative signal strength of the two targets involved.

In the output of the beam selector and side lobe canceller 60, therefore, each target (assuming that they are all well separated) will be represented by a pulse of some fixed height, in one of the 221 channels that corresponds to its elevation, at a time after the main bang determined by its range. The pulse will occur after the main bang (or bangs) that corresponds to the azimuth of the target.

The signals at the output of beam selector 60 could be sent directly to the height computer at computer station 13, but this would not be practical where the computer station is at any considerable distance from the electronics building 12. If the computer station 13 is spaced several miles away, it is more economical to reduce the number of transmission channels between the electronics building 12 and the computer station 13. Accordingly the pre-encoding logic circuit 80 of FIG. 2 and a binary encoder and decoder are connected to the output of beam selector 60. The purpose of the pre-encoding logic circuit is to handle the condition where two targets have substantially the same azimuth and range but different altitudes and therefore provide almost simultaneously received pulses.

In this case the binary encoder 81 (FIG. 2) which follows the logic circuits 80, would be faced with simultaneous signals on two of the channels from the beam selector. The objective of the logic circuits 80 is to inhibit the pulse on one channel (which carries say the very slightly later pulse) following the first main bang on which the situation arises. Following the very next main bang the pulse on the other channel is inhibited, and this alternation continues as long as the two pulses are received.

The general method of doing this is to have the channels trigger blocking oscillators, to put out pulses say 4.5 micro-seconds in duration. At the same time the oscillators send pulses into a common control unit, which returns sensitizing and inhibiting signals back to the appropriate blocking oscillators.

Figure 7:
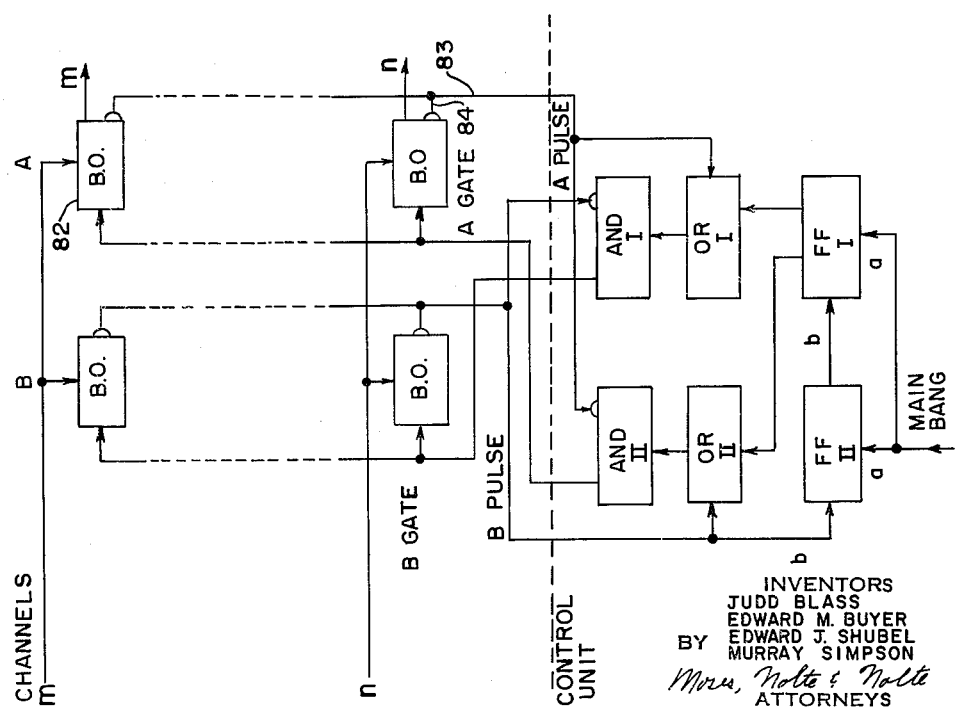
FIG. 7 is a block diagram of the pre-encoding logic circuit.

Specifically, referring to FIG. 7, the various channels $m$, $n$ from beam selector 60 trigger off two sets of blocking oscillators, A and B. Of these, the A oscillators send pulses to the output, and also to the control unit. The B oscillators send pulses only to the control unit.

In the absence of B pulses, flip-flop II is maintained in its reset state by the application of main bang triggers to the reset input. Flip-flop I is maintained in the set state by the application of main bang triggers to its set input. The one output from flip-flop I is fed to OR gate II, and the zero output to OR I, so that in the absence of a reset pulse from flip-flop II, flip-flop I keeps AND gate II on and AND gate I off. In this state, the A channel blocking oscillators are enabled and the B channel blocking oscillators are disabled.

A single pulse entering the system, say on channel $m$, fires the A blocking oscillator 82, putting a 4.5 microsecond pulse on the output $m$. It also sends back an A pulse over connection 83 to the control unit. On the way, by connection 84, this inhibits all the other A blocking oscillators. It inhibits AND gate II and opens OR gate I and B gate (too late, however, to permit firing blocking oscillator B) through AND gate I. If no further signal pulses enter the system, at the trailing edge of the A pulse the inhibition of AND gate II, and opening of B gate cease. This leaves the control unit as it was before.

If however, a second pulse appears on channel $n$ before the end of the 4.5 microseconds it will fire its B blocking oscillator. This sends a B pulse to the control unit, to set flip-flop II and energize OR gate II (and therefore also AND gate II), but this does not go further while the A pulse continues to inhibit. When the A and B pulses cease, the control unit returns as it was before, except for the setting of flip-flop II.

When the next main bang comes in, it resets flip-flop II which resets flip-flop I. Thus now OR gate I and AND gate I are energized, and the B gate is opened. As the first signal pulse comes in on channel $m$, it fires blocking oscillator B, which sends a B pulse inhibiting all other B oscillators, inhibits AND gate I, energizes OR gate II, AND gate II, opens A gate and sensitizes all A blocking oscillators. It also sets flip-flop II.

When the second pulse comes in on channel $n$ it fires blocking oscillator A to give a 4.5 microsecond pulse in the output $n$. It also sends an A pulse to the control unit and inhibits all other A blocking oscillators. It inhibits AND gate II, energizes OR gate I and AND gate I, and opens B gate (too late to permit firing the B blocking oscillator). After 4.5 microseconds the A pulse drops back and the control unit remains with flip-flop II set and flip-flop I reset. When the next main bang comes, it resets flip-flop II and sets flip-flop I, which returns the system to the earliest condition described. Thus the logic circuitry eliminates substantially simultaneous pulses in different channels and permits the subsequent binary coding and decoding of one channel at a time.

Figure 8A:
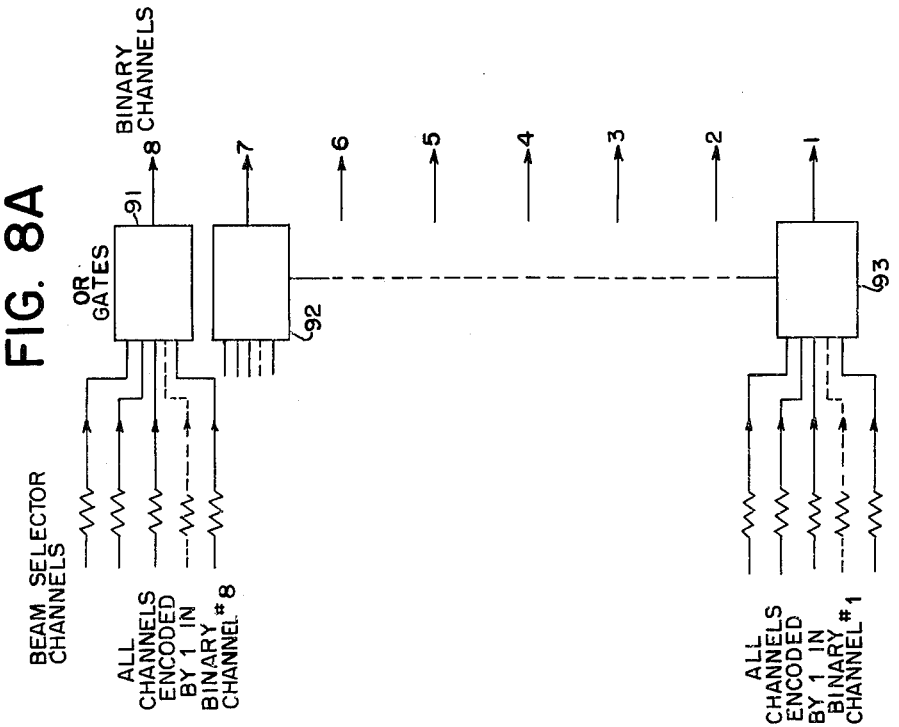

The binary encoder 81 of FIG. 2 is illustrated in FIG. 8A. There are 221 channels coming from the beam selector 60 through the pre-encoding logic 80 which has just been described. A 4.5 microsecond pulse coming through any one of these can be translated into a pulse of the same duration coming simultaneously through a combination in a group of 8 binary code channels. The successive beam selector channels can, for example, be coded as follows:

| Binary channel | 1 | 2 | 3 | 4 | 5 | 6 | 7 | 8 |
|---|---|---|---|---|---|---|---|---|
| Beam selector ch. 1 | 0 | 0 | 0 | 0 | 0 | 0 | 0 | 1 |
| Beam selector ch. 2 | 0 | 0 | 0 | 0 | 0 | 0 | 1 | 0 |
| Beam selector ch. 3 | 0 | 0 | 0 | 0 | 0 | 0 | 1 | 1 |
| Beam selector ch. 4 | 0 | 0 | 0 | 0 | 0 | 1 | 0 | 0 |
| * * * | | | | | | | | |
| Beam selector ch. 255 | 1 | 1 | 1 | 1 | 1 | 1 | 1 | 1 |

This means that a pulse in beam selector channel 1 would give a pulse only in binary channel 8. In beam selector channel 2 it would energize only binary channel 7. In beam selector channel 3 it would energize only binary channels 7 and 8. Finally if there were a 255th beam selector channel, a pulse in it would give a pulse in all 8 binary channels.

The encoder consists of 8 OR gates 91, 92, 93, one for each binary channel. There is then an input to OR gate #1, from every beam selector channel showing a 1 for binary channel 1 in the code. For binary channel #2, its OR gate has an input from every beam selector channel showing a 1 for binary channel 2 in the code. This continues to binary channel 8.

The signal in this binary form can be transmitted the few miles between the electronics building and the computer station over 8 signal transmission lines.

The binary decoder 100 shown in FIG. 2 is illustrated in more detail in FIG. 8B. It consists of pairs of AND and OR gates 101–106, one for each of the beam selector channels into which the pulses are to be fed, and now over only one channel at a time.

The AND gate 101 is now connected only to binary channels in which a 1 occurs in the coding for beam selector channel #1. For the code suggested this is binary channel #8. The OR gate 102 is connected only to binary channels in which a 0 occurs in the code. This means binary channels #7, 6, 5, 4, 3, 2, 1.

For beam selector channel 2 the AND gate 103 is connected only to binary channel #7, the OR gate 104 to #8, 6, 5, 4, 3, 2, 1.

For beam selector channel 255, if there were one, the AND gate 105 would be connected to all 8 binary channels, and the OR gate 106 would have no connection.

Thus the binary channels in which there is a pulse, connect to all beam selector channel AND gates which show 1's in such binary channels. The OR gates inhibit all of these AND gates for which one or more 1's appear which are not in the code. Thus for beam selector #1 channel the 1 appears on binary channel #8. If one or more 1's appear on binary channel #7, 6, 5, 4, 3, 2, 1, the coding is not for beam selector #1, and the OR gate 102 inhibits it.

Figure 9:
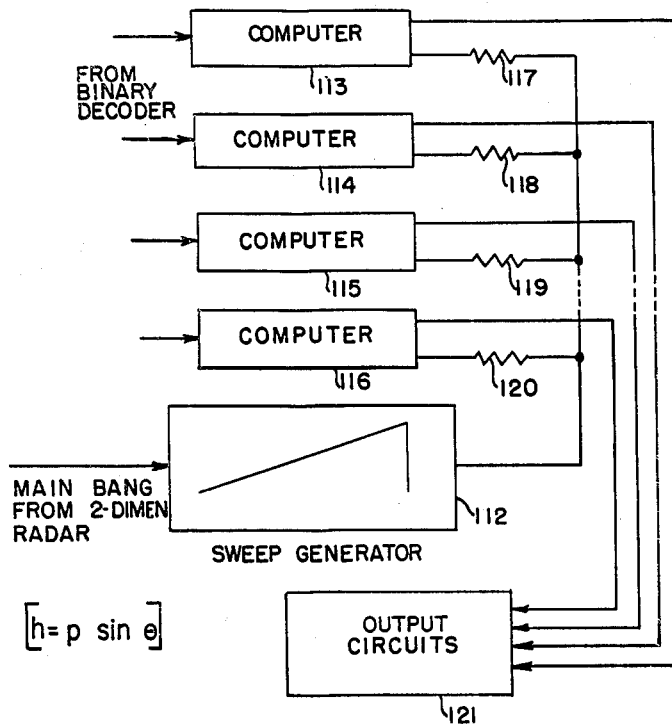
FIG. 9 is a diagram of the height computer circuitry.

Since the data processing and display equipment into which the system eventually feeds signals are analog devices, the height computer must convert the range and angle information to pulse analog form, the amplitude representing target altitude, and the pulse time coincident with the target altitude, and the pulse time coincident with the target return from the two-dimensional radar. The outputs of the beam selectors 60 are fed to the respective height computers 110 whose function is to convert the combination of range and angle of arrival data into an analog height output. The height computer circuitry is shown in FIG. 9, together with the equation $h = p \sin \theta$ which it must solve. This equation consists of two parts, a trigonometric product $p$ involving range and the sine of the angle of arrival. The general arrangement and operation of the height computer circuitry 110 (FIG. 2) will be described first with reference to FIGS. 9 and 10.

A saw-tooth voltage corresponding to the general equation given above is initiated by a trigger from receiver 111 of the two-dimensional radar 10. The output of the sweep generator 112 is fed in parallel to each of the 221 computer channels 113–116, etc. Each of the sweep inputs is attenuated by attenuators 117–120 just enough to correspond to the factor sin $\theta$ of the equation. The range factor $p$ is proportional to the delay of the return from the main bang, as reproduced by the sweep.

Figure 10:
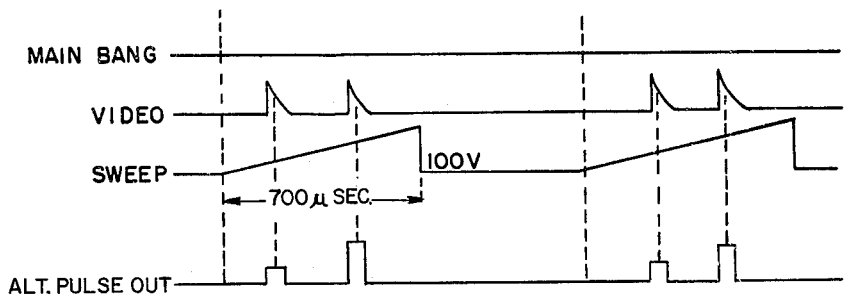
FIG. 10 is a diagram of voltage wave forms illustrating the operation of the circuits of FIG. 9.

Thus the sweep generator 112 furnishes an output to each elevation channel which is at every instant of time after the main bang equal to the height of a radar target which could be received at that time. The first order approximation of the sweep waveform is a linearly increasing voltage having a slope proportional to the sine of the elevation angle. When the radar target pulse is received, a sampling switch in computers 113–116 connects the sweep output to the system output for 4.5 microseconds, which has been selected to satisfy the requirements of a tracking computer. Thus the output to circuits 121 from this particular channel is a pulse which comes at the time of the radar target pulse, and of an amplitude which is an analog to the height. This is illustrated in FIG. 10.

Figure 11:
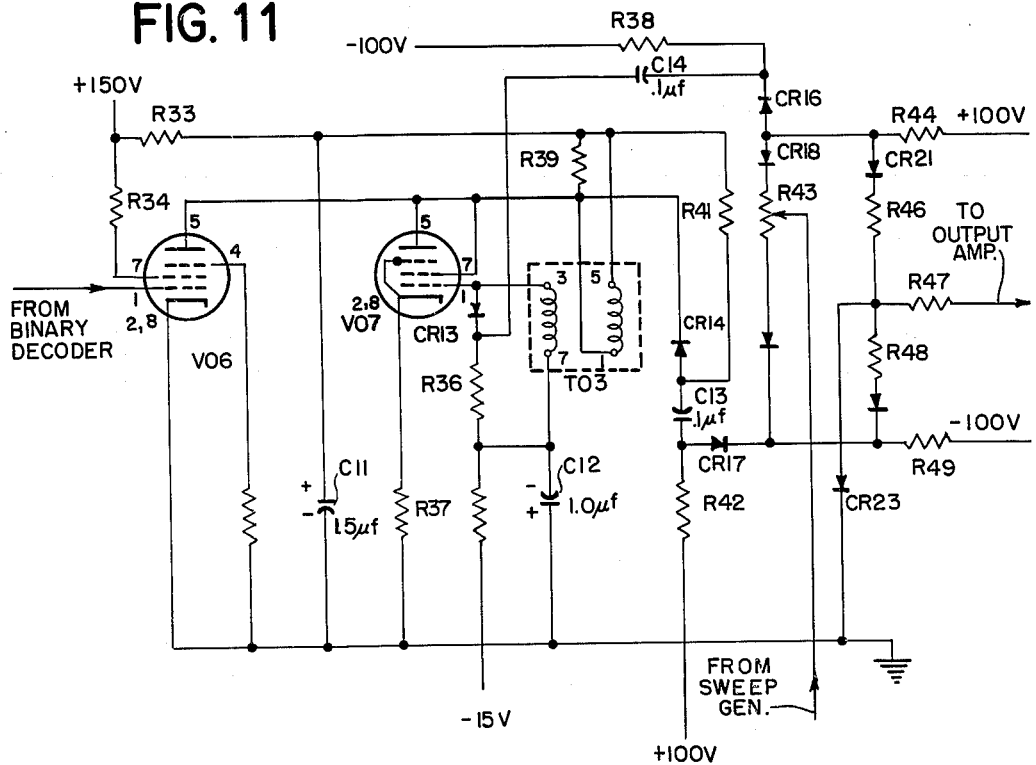
FIG. 11 is a circuit diagram of one of the computers of FIG. 9.

The details of the equipment in the boxes marked "Computer" in FIG. 9, of which there are 221, are illustrated in FIG. 11.

The binary decoder output which is a video signal enters the circuit of FIG. 11 on the lead 129 at the left. The suppressor grid of tube V06 is normally maintained at zero volts and consequently, plate current flows in tube V06 at the leading edge of the trigger pulse. The V06 plate current pulse flows through transformer T03 and triggers blocking oscillator V07. Circuit and pulse transformer design results in a 4.5 microsecond pulse, 10 volts positive at the cathode, 50 volts positive at the grid, and 50 volts negative at the plate of tube V07.

Switch diodes CR18 and CR21 are normally held off by voltage divider R44, CR16, and R38, which develops $-25$ volts at the diode anodes. Switch diodes CR19 and CR22 are held off by voltage divider R42, CR17, and R49 which develops $+25$ volts at the diode cathodes.

A positive pulse appearing at the grid of V07 is coupled through CR13 and C14 to the cathode of CR16, cutting it off. The negative pulse at the plate of V07 is coupled through CR14 and C13 to the anode of CR17, cutting it off.

Current now flows through switch diodes CR18, CR19, CR21, and CR22. Since the diode forward impedances are low and the diodes are connected in pairs by low impedances, the junctions of the diodes assume approximately equal voltages. Consequently, the circuit can be considered a switch which connects the wiper of resistor #43 to the output side of R47 when the hold-off voltages are removed.

Resistor R43 is a zero adjustment, used to compensate the diode bridge for diode dissimilarity. It is set to yield a zero output at the junction of R47 and CR23 when the wiper of R43 is at zero volts and the bridge is conducting. R46 and R48 match the fixed arms of the bridge to the adjustable arm.

The sweep is applied to the wiper of resistor R43. Closing of the switch, therefore, transfers the appropriate portion of the sweep voltage to R47 for a period of 4.5 microseconds.

The output amplifier 122 accepts the analog pulses from all of the feed lines (or rather their corresponding sampling switches) in turn. This acceptance in turn occurs as the pulses appear, and all of the sampling switches of computers 113–116 stay constantly connected to the output amplifier.

Figure 12:
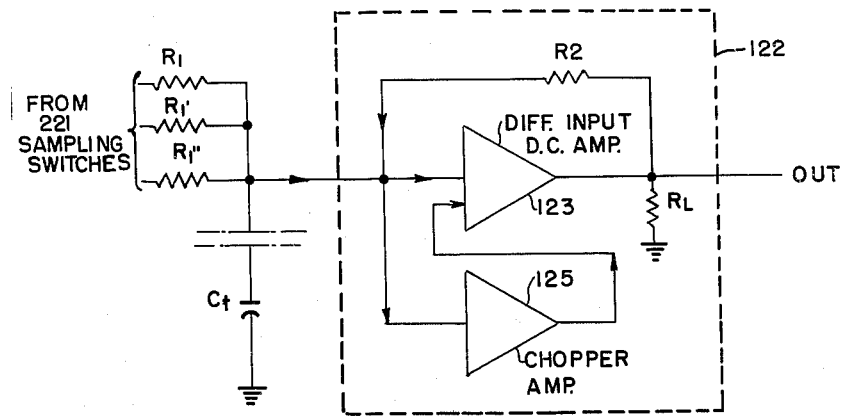
FIG. 12 is a schematic diagram of the output amplifier.

A schematic of the output amplifier is shown in FIG. 12. The amplifier actually comprises two separate amplifiers 123 and 125. Amplifier 123 is a differential amplifier and amplifier 125 a conventional chopper. The purpose of this amplifier 122 is to sharpen the pulses, whose edges would be distorted by the capacity $C_t$ involved in paralleling as many as 221 input circuits. This is accomplished by the substantial negative feedback around the amplifier 123 through the resistance $R_2$. The chopper 125 periodically (60 times per second) readjusts the zero voltage base of the signal, so that the tops of the height pulses will have true analog significance. The output of amplifier 122 is developed across load resistor $R_L$.

The altitude layer filter 130 allows only a selected altitude slice of airspace to be displayed on conventional plan position (PPI) indicators 140. The altitude layer processor employs the output of the height computer 110 and output amplifier 122 as input signals and provides for five independent outputs, each of which has the form $$(p, \theta)_{h_1}^{h_2}$$

where $h_1$ and $h_2$ determine the altitude and thickness of the slice. $(h_2-h_1)$ is manually adjustable to any slice value from 1,000 to 20,000 feet, beginning with any base altitude $(h_1)$ from ground elevation to 99,000 feet. The output video from each channel can drive the input radar video circuit of a conventional PPI indicator.

The requirements of the altitude layer filter processor are met by applying an instrument known in nucleonics as "the differential pulse height analyzer." A single-channel differential pulse height analyzer is a device that generates an output signal if, and only if, an input pulse having an amplitude within a specified window is received. FIG. 13 is a block diagram of the single-channel analyzer. Two items of information must be determined:

(a) Whether or not the pulse has crossed the lower boundary of the amplitude window.

(b) Whether or not the pulse has crossed the upper boundary.

The signals indicating the upper or lower level crossings are obtained from voltage discriminators 131 and 132, which are supplied in parallel with the input pulses from output amplifier 122 after passing through amplifiers 133 and 134. Discriminators 131 and 132 are connected to a memory and anti-coincidence circuit 135 which produces an output pulse when the input pulse is in the selected height slice. Differential pulse height analyzers that have substantially the needed characteristics are commercially available.

FIG. 14 is a block diagram of the altitude layer processor 130. Outputs from the various pulse height analyzers 141–145 are used to gate "on" a video stage 146–150, thus allowing the $(p, \theta)$ pulse occurring at this time to pass through to the PPI 140. Each analyzer 141–145 consists of the circuit 131–135 shown in FIG. 13. A small delay device 151 in the $(p, \theta)$ video line 152 is required to compensate for analyzer and gate delays. To maintain the indicator sweep accuracy, the indicator triggers are passed through a delay line (not shown) matched to the video delay. The small delay required does not deteriorate either the video or the trigger signals.

The height, range, and azimuth outputs from receiver 111 and output amplifier 122 are also fed to suitable utilization 121, such as three-dimension display apparatus and/or three-dimension tracking computer apparatus.

Figure 15:
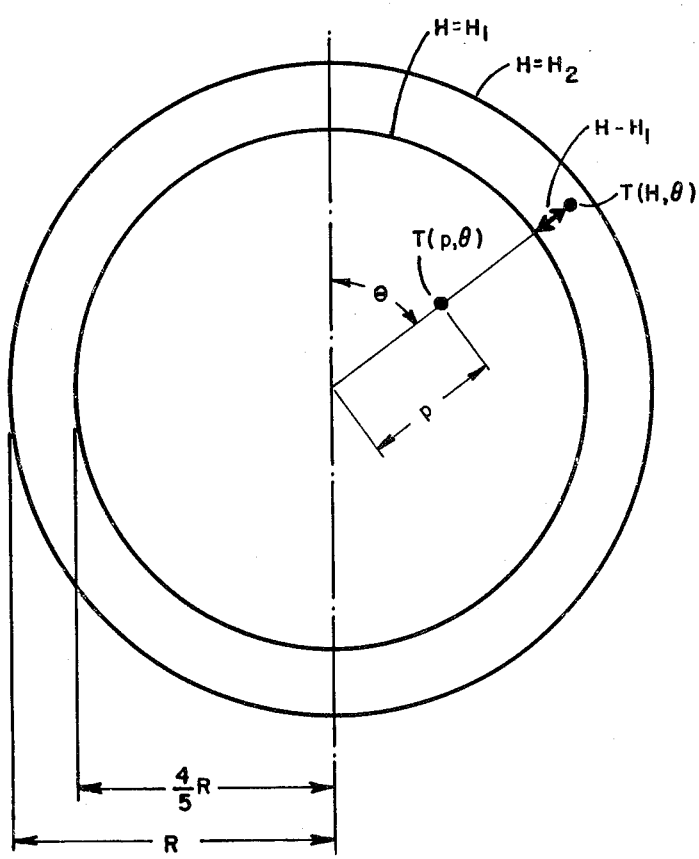
FIG. 15 is a view of the radar display tube face showing target range, bearing and altitude information.

A device which may be used to display the three-dimensional information is shown in FIG. 15. This device forms the subject matter of U.S. patent application Serial No. 150,287 of Edward M. Buyer, filed November 6, 1961, and is a preferred display means, although any three dimensional display means may be used instead. A target T is located at a bearing angle $\theta$, and range $p$, from a center reference point and line, within a first inner four-fifths portion of the total deflection R or sweep across the tube face. A second outer ring portion between ⅘R and R completes the display and indicates the height (H) of the target T, within an altitude sector between rings $H_1$ and $H_2$.

Figure 16:
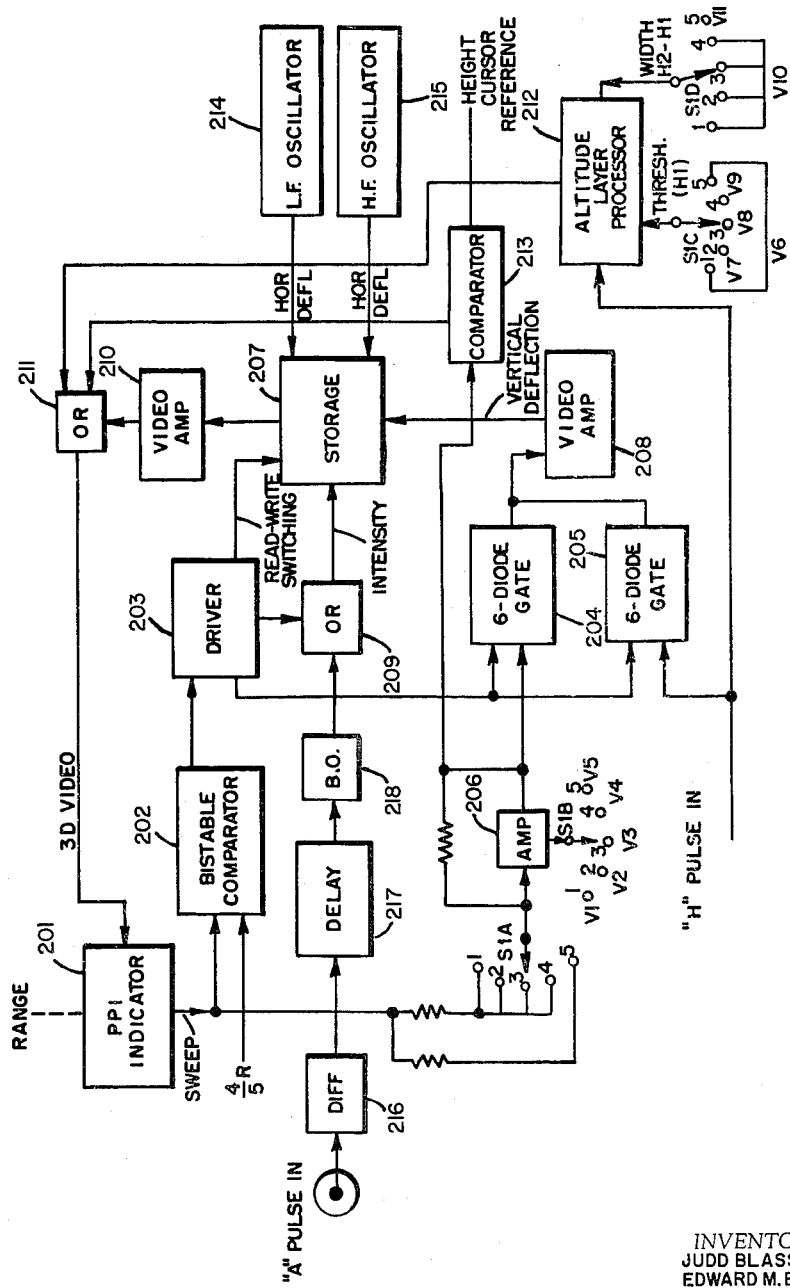
FIG. 16 is a block diagram of the system used to achieve the novel display.

FIG. 16 shows a height analog pulse "H," which is derived from the height-finding radar system, and inserted into the altitude layer filter 130. The output pulse of this unit is shown as waveform H in FIG. 17. The altitude layer filter 130 generates an output pulse only when its input lies between the selected threshold and threshold plus width display area. Threshold and width reference voltages V6–V10 are fed to the altitude layer filter through switch sections S1C and S1D. The output pulse feeds through OR gate 211 to the video input of a standard PPI indicator 201 and paints the inner portion $(p, \theta)$ of the three-dimensional display.

Sweep is taken from the PPI indicator 201, and applied to a bi-stable comparator 202, which switches when its input reaches the level corresponding to ⅘ deflection on the display tube. One such suitable comparator is the cathode coupled multivibrator shown in "Pulse and Digital Circuits" by Millman and Taub, pages 475–476. If the PPI indicator utilizes sweep speed or range adjustment after coordinate resolution, an indicator modification may be utilized. This may comprise a potentiometer ganged to the range shaft to attenuate the unresolved sweep. The potentiometer wiper then furnishes the required input for comparator 202.

Figure 17:
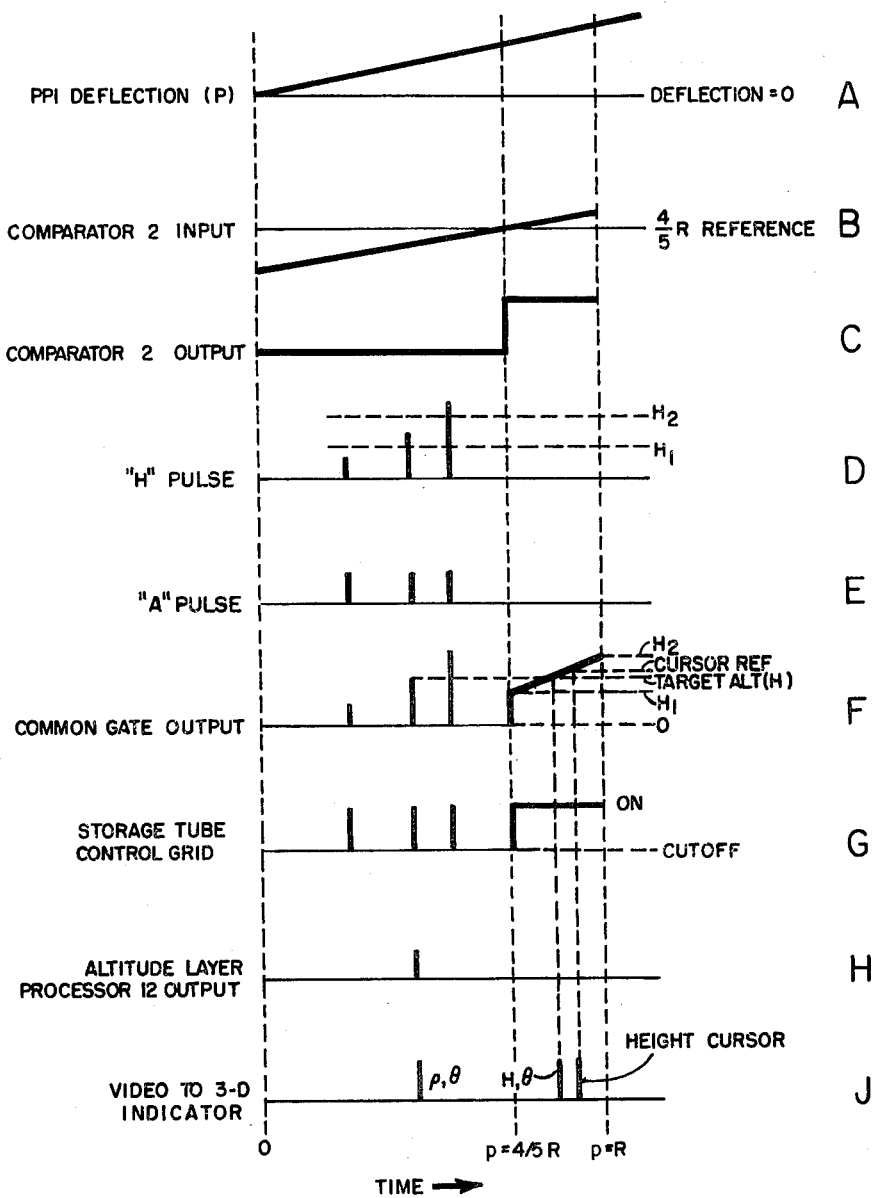
FIG. 17 is a diagram showing pulses and wave forms at various portions of the system.

Waveforms A, B and C of FIG. 17 represent PPI deflection, and comparator input and output respectively. The output of the bi-stable comparator is passed through push-pull driver 203 which supplies positive and negative pulses to 6-diode gates 204 and 205. A more complete description of these gates may be found in the same above-mentioned text, pages 445–447. The driver output switches diode gate 4 from OFF to ON and diode gate 205 from ON to OFF at ⅘R.

The other input to gate 204 is a level-shifted indicator sweep. This sweep is provided by differential feedback amplifier 206 to which are fed the indicator sweep and selectable D.C. references V1–V5 from switch S1B. The D.C. reference shifts the sweep level so that the amplifier output reaches a voltage corresponding to $H_1$ the lower height, when $p=\frac{4}{5}R$. For example, if $H_1$ equals 20,000 feet, $H_2=30,000$ feet, and the H pulse scale factor is .1 volt per 1,000 feet, the level shift and sweep scale factor would be required to produce an amplifier output of two volts at $p=\frac{4}{5}R$, and an output of three volts at $p=R$. If $H_1=30,000$ feet and $H_2=40,000$ feet, the scale factor remains unchanged, but an additional level shift of 1 volt is required.

The indicator sweep speed is adjusted so that the useful end of the radar return period occurs at ⅘R. If the indicator is calibrated in range, it will be necessary to make the necessary internal adjustments to slow down the indicator sweep so that the range dial actually reads full range at $p=\frac{4}{5}R$.

In one form of the device, four height scales 1–4, are utilized, each representing increments of 10,000 feet and a fifth scale 5 represents the full range from 0 to 40,000 feet. A change in scale factor is required only on scale 5. As shown in FIG. 16, this is done by switching the input resistor of amplifier 206 on step 5 of switch S1A. In the altitude layer filter 130 the threshold levels are identical at positions 1 and 5 of switch S1D. Switch sections S1C and S1D track the altitude layer filter reference voltage to the three-dimensional control settings which are on switches S1A and S1B. When it is desired to monitor all of the ranges simultaneously, duplicate sets of equipment may be utilized.

Figure 18:
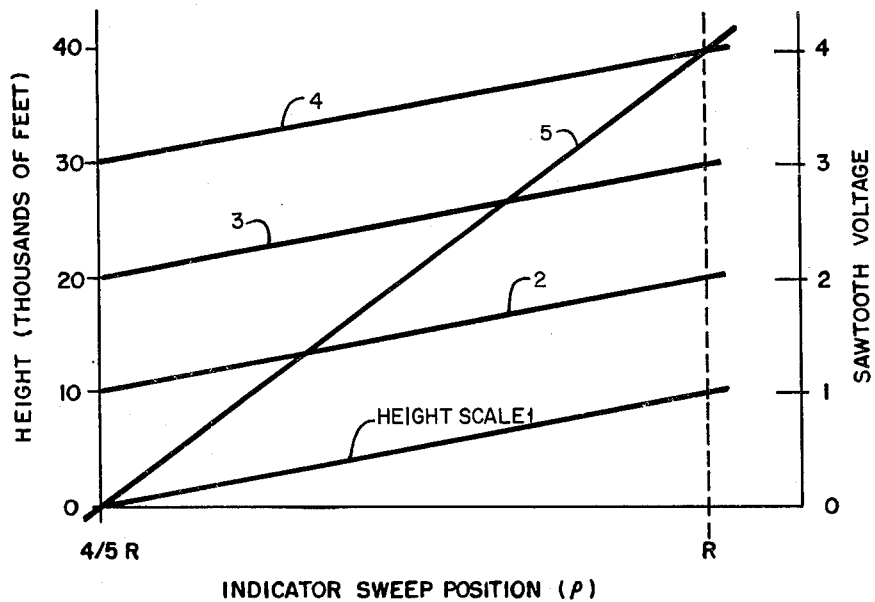
FIG. 18 is a diagram showing sawtooth altitude pickoff waveforms for the several altitude scales.

FIG. 18 shows the output waveform for the above five scales. Here only the portion of the sawtooth sweep between ⅘R and R is plotted, the remainder of the waveform being immaterial for the altitude display.

The common output of gates 204 and 205, shown as waveform F of FIG. 17, as amplified in the video amplifier 208 and applied to the vertical deflection plates of a barrier grid storage tube 207 of a type known as a Radechon, such as manufactured by the Radio Corporation of America. This tube is similar to a cathode ray tube in appearance and construction, except that the phosphor screen is replaced by a storage screen assembly. Instead of producing visible light at a position determined by the applied voltages to the horizontal and vertical deflection plates, a charge is stored at this position. The charge is proportional to the instantaneous beam intensity and is hence determined by the control grid potential.

By changing the potential of the storage screen, the tube operation changes from "write" to "read." During "read" the storage screen is scanned by a constant intensity beam. When a spot which has been charged during the "write" process is scanned, an output proportional to the charge density is generated and the charge is "erased." A further detailed description of the storage tube and associated circuitry may be found in "Radechon Storage Tube Circuits" by Jensen and Gray, RCA Review, vol. 16, 1955, p. 234–241.

During the range sweep, driver 203 applies "write" voltage to the storage screen. The electron beam is pulsed ON only while an "A" trigger pulse is present. The "A" pulse is generated by the sample switch blocking oscillators (FIG. 7), which are part of the external height-finding radar, concurrently with "H," the height analog pulse, as illustrated by waveforms D and E of FIG. 17.

The A pulse is passed through a differentiator circuit 216 to select its leading edge and then through delay circuit 217 to develop a signal to intensify a portion of the flat top of the height analog pulse. Blocking oscillator 218 amplifies and determines the duration of the intensifier pulse. The net effect is to "write" a spot on the storage screen at a vertical position proportional to the aircraft altitude. Since the same amplifier is used to deflect both the height pulse and the sawtooth "read" sweep, equal height and sawtooth voltages will result in identical beam positions, while aiding the cancellation of amplifier drift and distortion.

When the sweep reaches the ⅘R point, driver 203 switches storage tube 207 to "read" and increases the storage tube control grid voltage by applying a step through OR gate 209 to bring the beam ON, as shown by waveform G in FIG. 17.

The sawtooth sweep is then applied to the vertical deflection plates. When the beam encounters a stored target, a pulse is fed through video amplifier 210 via OR gate 211 to the PPI indicator 201. The "read" operation automatically erases all stored targets. On flyback or return, the three-dimensional processor automatically reverts to "write" as the deflection voltages passes through the ⅘R level.

A comparator 213 generates a height cursor or altitude reference line when the sawtooth from amplifier 206 reaches a present height. For example, a height reference of 2.5 volts yields a 25,000 foot height circle cursor. A suitable comparator may be found in the previously mentioned "Pulse and Digital Circuits," pages 468–473, referred to as the Multiar. The output pulse of comparator 213 feeds the indicator 201 through OR gate 211. The composite video drive to the three-dimensional display indicator is shown as waveform J of FIG. 17.

Since the operation of the storage tube in the single vertical trace mode described may damage the storage screen, a low frequency wobulation is employed. Low frequency oscillator 214 slowly moves the vertical trace over the storage screen by driving the horizontal deflection plates. The wobulation must be slow enough so that the sawtooth height pick-off sweep is displaced from the preceding height storage by substantially less than a beam spot diameter to provide sufficient resolution.

High frequency oscillator 215 prevents horizontal deflection noise, such as electrostatic and magnetic field pickup, from causing the "read" sweep to misregister with the preceding "write." Oscillator 215 applies a small high frequency horizontal perturbation of approximately several spot diameters and about ten megacycles, creating the effect of an elliptical scanning spot, assuring that the "read" sweep contacts the stored targets in spite of random low-level horizontal deflection. Pass-band limitations in subsequent circuitry remove the ten megacycles component from the signal.

While a preferred embodiment has been illustrated, it is apparent that the invention is not limited to the exact form or use shown, and that many variations may be made in the particular design and configuration without departing from the scope of the invention as set forth in the appended claims.

We claim:

1. A surveillance device comprising a range and azimuth determining radar system, a receiving antenna, said antenna having a plurality of vertical walls angularly disposed to one another, each wall having a plurality of vertically extending feed lines and a vertical array of radiators selectively connected to the feed lines so that the feed lines are separately responsive to echoes arriving at different elevation angles, said echoes being target reflections of waves radiated by the range and azimuth radar, an omnidirectional antenna, beam selecting and side lobe cancelling means for combining the outputs of said antennas and cancelling signals in said feed lines due to off-beam or side lobe reception by the height finding antenna and producing outputs only from feed lines receiving echoes on the main lobes of the radiation patterns thereof, height determining computer means connected to said last means and to said range and azimuth radar for receiving the outputs of said last means and the range and azimuth signals of said radar and deriving therefrom output signals representative of the heights of the targets.

2. A surveillance radar device capable of simultaneously determining height, range and azimuth, comprising a range and azimuth measuring radar, a receiving antenna, said antenna having a plurality of vertically extending waveguide feed lines and a vertical array of waveguides extending transversely of the feed lines and having vertically aligned radiators, the feed lines being each connected to a selected plurality of said waveguides for separately translating energy in response to echoes arriving at different elevation angles, said echoes being target reflections of waves radiated by the range and azimuth radar, an auxiliary antenna, means for combining the outputs of said antennas and cancelling signals in said feed lines due to side of beam or side lobe reception by the height finding antenna and producing outputs only from feed lines receiving echoes on the main lobes of the radiation patterns thereof, height determining computer means connected to said last means and to said range and azimuth radar for receiving the outputs of said last means and the range and azimuth signals of said radar and deriving therefrom output signals representative of the heights of the targets.

3. A device according to claim 2, including pre-encoding means connected between said means for combining and the height computer means, said pre-encoding means being responsive to two substantially simultaneously received pulses for suppressing one of said pulses and then the other during successive receptions of said two pulses.

4. A device according to claim 3, including binary encoding means connected to the output of the pre-encoding means, binary decoding means located remotely from said encoding means, transmission lines connecting the output of the encoding means to the decoding means, and means connecting the decoding means to the height computer means.

5. A device according to claim 4, including means connected to the output of the height computer means for selecting only pulses from targets within a given limited portion of the heights from which echoes are received.

6. A radar antenna comprising a tower in the form of a prism having vertical sides, a plurality of substantially horizontal rectangular waveguides extending along each side, all said waveguides on each side having vertically aligned radiators at one end, a plurality of rectangular feed waveguides extending generally transversely to the horizontal waveguides and adjacent thereto, directional coupling means at the crossovers of the horizontal and the feed waveguides interconnecting them so that the several feed waveguides selectively receive waves arriving at different angles of elevation, said horizontal and feed waveguides having non-reflecting terminations at one end.

7. A radar antenna according to claim 6 wherein said feed waveguides extend at the different angles to the vertical.

8. A radar antenna according to claim 7, wherein the feed waveguides extend to different heights on the tower and thereby are coupled to different groups of horizontal waveguides.

9. A radar antenna according to claim 8 wherein the directional coupling means provide different amounts of coupling at different crossover points.

10. Radar apparatus for obtaining three-dimensional information, comprising a two-dimensional range and azimuth determining pulse radar means, a stationary receiving antenna having a plurality of radiation lobes for receiving echoes from targets of pulses transmitted to the targets by the two-dimensional radar means, and receiving means connected to said receiving antenna and responsive to the lobes receiving said echo pulses for obtaining elevation information simultaneously with the azimuth and range information obtained from the two-dimensional radar means.

11. Radar apparatus according to claim 10, wherein said receiving means includes height computing means for converting elevation information into linear height information.

12. Radar apparatus according to claim 10, wherein said receiving means includes a plurality of separate channels, each of said channels being responsive to a predetermined radiation lobe and thus a predetermined angular increment of elevation, means for transmitting through each of said channels signals indicative of the range and elevation of a target within the elevation increment of that channel, and additional separate channels for transmitting said azimuth and range information.

13. Radar apparatus according to claim 12, wherein said elevation information transmitting channels include a binary encoder located near the receiving antenna, a binary decoder located remotely from said binary encoder, and means for transmitting information from the encoder to the decoder.

14. Radar apparatus capable of simultaneously determining height, range and azimuth, comprising a range and azimuth measuring pulse radar means, a receiving antenna having a plurality of main radiation lobes at successive elevations, said antenna having a plurality of vertically extending waveguide feed lines and a vertical array of waveguides extending transversely of the feed lines and having vertically aligned radiators, the feed lines being each connected to a selected plurality of said waveguides for separately translating signals in response to echoes arriving at different elevation angles, said echoes being target reflections of waves radiated by the range and azimuth radar means, side lobe cancelling means connected to said feed lines for suppressing signals due to side lobe reception by the height finding antenna and producing outputs only from echoes receiving on the main lobes of the antenna.

15. Radar apparatus according to claim 14, including means connected to said side lobe cancelling means and responsive to two substantially simultaneously received pulses for suppressing one of said pulses and then the other during successive receptions of said two pulses.

16. A three-dimensional radar including means for transmitting radar signals and receiver means responsive to the signals reflected from one or more targets, said receiver means including a first antenna for scanning in azimuth, a stationary antenna producing a radiation pattern having individual beams covering predetermined angles of elevation, and means responsive to the signals received by said first and stationary antennas for producing signals to be displayed indicative of the range, height and azimuth of one or more targets said means including a plurality of channels connected from said stationary antenna, each of said channels being responsive to echo pulses received by predetermined beams whereby the channel in which a signal appears is indicative of the presence of a target at a predetermined angle.

17. A three-dimensional radar according to claim 16, wherein said first antenna is connected to means for producing a signal indicative of the range and azimuth information of said targets, and said stationary antenna is connected to means for producing a pulse whose amplitude is the analog of the height of respective targets and whose time of occurrence is related to the range thereof.

18. A three-dimensional radar according to claim 16, including an altitude layer processer for inhibiting the passage of signals relative to targets whose height lies outside of a predetermined range.

19. An air height radar device for use with a pulse type radar transmitter, comprising a stationary receiving antenna responsive to the target reflections of pulses from said transmitter, said antenna including means for producing a plurality of directional radiation beams, each of said beams extending at a predetermined angle of elevation, respective translation channels for transmitting target signals in response to the reflected energy detected by said beams, and receiver means coupled to all of said channels for producing height information dependent upon the channels in which said target signals appear and the time at which they occur.

20. An air height radar device according to claim 19, including means for comparing the signal strengths of channels coupled to adjacent radiation beams, and means responsive to said comparing means for suppressing those signals which are a predetermined amount weaker than the signals with which they are compared.

21. An air height radar device according to claim 20, including a plurality of additional channels parallel to said translation channels and means for energizing selected ones of said additional channels when substantially equal signals appear on adjacent radiation beams, said last named means being operative to block the translation of signals on the channels associated with said adjacent beams.

22. An air height radar device according to claim 21, wherein said receiver means includes respective height computer means in each of said translation channels and said additional channels, each of said height computer means including a fixed voltage wave generator operative in response to the transmission of a pulse by said transmitter, and means for gating the output of said wave generator during the period in which a signal appears in the channel associated therewith.

23. An antenna having a plurality of directional lobes in predetermined directions, comprising a plurality of radiating elements, a plurality of transmission lines each connected to respective ones of said radiating elements, a plurality of feed lines intersecting said transmission lines, means for non-reflectively terminating said transmission lines and said feed lines, directional couplers connected between said feed lines and said transmission lines at the intersections thereof, each feed line being coupled to a plurality of radiating elements so as to provide one of said directional lobes, and a separate signal translator circuit connected to each of said feed lines whereby a plurality of signals of the same frequency may be simultaneously translated by said antenna on respective lobes.

24. An antenna having a plurality of directional radiation beams, comprising a plurality of radiating elements, a transmission line connected to each of said radiating elements, a plurality of feed lines, means for non-reflectively terminating the transmission lines and the feed lines, directional couplers having predetermined amounts of directional coupling connected between each feed line and a plurality of selected transmission lines, said feed lines being coupled to the transmission lines at sequentially spaced points therealong so that each feed line is effectively connected to said radiating elements to produce one of said beams, and separate means connected to each of said feed lines for translating radio signals of the same frequency simultaneously on different ones of said beams.

25. A multi-directional antenna system having a plurality of directional radiation lobes simultaneously extending in discrete directions throughout a wide angular range, comprising a plurality of radiating elements arranged in an array and a plurality of substantially parallel spaced transmission lines, each said transmission line being connected to a corresponding one of said radiating elements, a plurality of diverging spaced feed lines intersecting said transmission lines, means for non-reflectively terminating said transmission lines and said feed lines, directional couplers connected between each feed line and a plurality of selected transmission lines, whereby each individual feed line is connected to said radiating elements so as to produce one of said lobes, whereby a plurality of signals of the same frequency may be simultaneously translated by said antenna on respective lobes.

26. A system according to claim 24, wherein each said feed line is arranged to traverse said transmission lines at different angles thereby providing different phase delays between successive junctions of said feed lines and said transmission lines.

27. Apparatus for simultaneously translating a plurality of signals of the same frequency, comprising a plurality of transmission lines, antenna means connected to each of said transmission lines, a plurality of antenna feed lines, coupling means connecting each of said antenna feed lines to each of said transmission lines, non-reflective means for terminating said transmission lines and said antenna feed lines, delay means for delaying the transmitted signals in each of said feed lines by equal amounts between successive transmission lines, the delay between successive transmission lines varying in different feed lines whereby a plurality of separate signals may be simultaneously translated over said antenna feed lines.

No References Cited.

CHESTER L. JUSTUS, *Primary Examiner.*